United States Patent
Wang et al.

(10) Patent No.: US 7,240,315 B1
(45) Date of Patent: *Jul. 3, 2007

(54) AUTOMATED LOCAL CLOCK PLACEMENT FOR FPGA DESIGNS

(75) Inventors: Qiang Wang, Campbell, CA (US); Sudip K. Nag, San Jose, CA (US); Srinivasan Dasasathyan, Sunnyvale, CA (US); James L. Saunders, Mountain View, CA (US); Pavanish Nirula, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 232 days.

This patent is subject to a terminal disclaimer.

(21) Appl. No.: 10/651,789

(22) Filed: Aug. 29, 2003

(51) Int. Cl.
*G06F 9/45* (2006.01)
*G06F 17/50* (2006.01)

(52) U.S. Cl. .......................... 716/10; 716/9
(58) Field of Classification Search ........... 716/1–13, 716/16, 18; 326/93; 327/293, 375; 345/440
See application file for complete search history.

(56) References Cited

U.S. PATENT DOCUMENTS

| | | | | |
|---|---|---|---|---|
| 6,111,448 A * | 8/2000 | Shibayama | .................. | 327/293 |
| 6,286,128 B1 * | 9/2001 | Pileggi et al. | ................. | 716/18 |
| 6,442,743 B1 * | 8/2002 | Sarrafzadeh et al. | .......... | 716/10 |
| 6,513,149 B1 * | 1/2003 | Donato | ......................... | 716/12 |
| 6,578,183 B2 * | 6/2003 | Cheong et al. | ................ | 716/7 |
| 6,583,648 B1 * | 6/2003 | Cai | ............................. | 326/93 |
| 6,609,228 B1 * | 8/2003 | Bergeron et al. | ............... | 716/2 |
| 6,851,099 B1 * | 2/2005 | Sarrafzadeh et al. | .......... | 716/10 |
| 6,865,726 B1 * | 3/2005 | Igusa et al. | .................... | 716/18 |
| 6,871,328 B1 * | 3/2005 | Fung | ............................. | 716/1 |
| 7,039,882 B2 * | 5/2006 | Rana et al. | .................... | 716/3 |
| 7,143,378 B1 * | 11/2006 | Nag | ............................. | 716/6 |
| 7,149,994 B1 * | 12/2006 | Dasasathyan et al. | ......... | 716/10 |
| 2003/0222872 A1* | 12/2003 | Lin et al. | ..................... | 345/440 |

OTHER PUBLICATIONS

U.S. Appl. No. 10/651,786, filed Aug. 29, 2003, Dasasathyan et al.
S. Kirkpatrick, C. D. Gelatt, Jr., M. P. Vecchi; "Optimization by Simulated Annealing"; Science; May 13, 1983, vol. 220, No. 4598; pp. 671-680.
Emi Eto et al.; "Local Clocking Resources in Virtex-II Devices"; XAPP609 (v1.2); Jan. 23, 2003; available from Xilinx, Inc., 2100 Logic Drive, San Jose, California 95124; pp. 1-14.

* cited by examiner

*Primary Examiner*—Jack Chiang
*Assistant Examiner*—Nghia M. Doan
(74) *Attorney, Agent, or Firm*—Pablo Meles; Robert Brush; Michael R. Hardaway (57) ABSTRACT

A method (500) of placing local clock nets in a circuit design can include identifying the local clock nets for the circuit design and selecting components corresponding to each local clock net (510,515), and assigning initial locations to each component of the local clock nets (520). The method further can include generating at least one cost function (530, 550) to evaluate (555) different placements of components of the local clock nets. The components (220, 240) of the local clock nets (205) can be annealed (535–575) using one or more of the cost functions to assign locations to each component of the local clock nets.

17 Claims, 4 Drawing Sheets

AUTOMATED LOCAL CLOCK PLACEMENT FOR FPGA DESIGNS

BACKGROUND

1. Field of the Invention

This invention relates to the field of physical circuit design and, more particularly, to the placement of a design.

2. Description of the Related Art

Designs for Field Programmable Gate Arrays (FPGA's) have become increasingly complex and heterogeneous. Modern FPGA designs can include a variety of different components or resources including, but not limited to, registers, block Random Access Memory (RAM), multipliers, processors, and the like. This increasing complexity makes placement of components within a circuit design more cumbersome.

Components of circuit designs traditionally have been placed together through a series of discrete phases or tasks. Each task is performed sequentially and independently of the others to place a particular set of components of the circuit design. For example, inputs and outputs (I/O's) are placed, local clock nets are placed, and global clock nets are placed.

The local clock net placement task assigns or constrains a local clock source, local clock loads, as well as the data components to be latched by the local clock, to physical locations on the chip or particular regions or areas of the circuit design. While local clock nets may be placed in a separate operation from other component types, the local clock net placement task is performed no differently than other placement tasks. That is, although local clock nets can be placed, any analysis as to whether the placement of the circuit design complies with design constraints is not performed until the signals of the circuit design are routed.

During routing, the local clock sources are given higher priority than other component types in an effort to minimize clock skew and clock signal delays. Despite the priority afforded to local clock sources during routing, when design constraints cannot be met with the current placement, the circuit design must be placed again. This can increase circuit development time as well as costs as the circuit design may require placement to be performed several times in order to meet timing requirements as specified by predetermined design constraints.

In any case, determinations as to whether the current placement is feasible are not made until after placement has finished and the signal routing phase has begun. What is needed is a technique for placing local clock nets that seeks to attain a feasible placement for a circuit design during the placement process and evaluate that placement during the placement process prior to routing signals of the circuit design.

SUMMARY OF THE INVENTION

The present invention provides a method, system, and apparatus for performing an automated placement of local clock nets for circuit designs. In accordance with one embodiment of the present invention, a regional placement of local clock nets for a circuit design in a PLD can be determined. A cluster of components related to each local clock source is placed in an area range according to the routing fabric of the PLD to meet timing requirements for each local clock net. Once determined, the location assignments for components in the local clock nets can be used as design constraints for further adjustment of the circuit design through placement of additional components and routing.

One embodiment of the present invention can include a method of placing local clock nets in a circuit design. The method can include identifying the local clock nets for the circuit design, selecting components corresponding to each local clock net, and assigning initial locations to each component of the local clock nets. One or more cost functions can be generated to evaluate different placements of components of the local clock nets. Accordingly, the components of the local clock nets can be annealed using the cost functions to assign locations to each component of the local clock nets.

The method also can include determining a set of solution windows having defined circuit resources. In that case, the annealing step further can include constraining local clock nets to particular solution windows using the cost functions. The annealing step can continue until at least one stopping criterion is met.

The generating step can include calculating a cost function indicating whether components of one of the local clock nets are located within a solution window identified by the local clock source of the local clock net, calculating a cost function indicating whether a solution window associated with one of the local clock nets includes sufficient resources for use by the local clock net, calculating a cost function indicating whether each component of a relatively placed module can be located within a solution window, and/or calculating a cost function indicating whether inputs and outputs related to the local clock nets conform to select input and output standards.

According to another embodiment, the present invention can include a method of placing local clock nets in a circuit design including: (a) determining a baseline placement for components of the local clock nets; (b) calculating at least one cost function to evaluate the baseline placement; (c) determining a new placement for the circuit design by relocating at least one component of the local clock nets; (d) calculating one or more of the cost functions to evaluate the new placement; (e) comparing one or more of the cost functions of the baseline placement with one or more of the cost functions of the new placement; (f) selecting either the baseline placement or the new placement as the baseline placement for subsequent iterations of said step (c) according to said step (e); and (g) repeating steps (c)–(f) until a stopping criterion is met.

Another embodiment of the present invention can include a system for determining placements of local clock nets of a circuit design in accordance with the inventive arrangements disclosed herein.

Yet another embodiment of the present invention can include a machine readable storage for causing the machine to determine a placement for local clock nets of a circuit design in accordance with the inventive arrangements disclosed herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

An exemplary embodiment of the present invention provides a solution for automatically placing local clock nets of a circuit design in a Programmable Logic Device (PLD), for example, a Field Programmable Gate Array (FPGA). More particularly, the local clock nets can be identified from a net list. An initial placement can be performed to serve as a baseline for annealing the components of the local clock nets. The annealing process is governed by one or more cost functions which guide the annealing process to a placement solution for the local clock nets of the circuit design.

Figure 1:
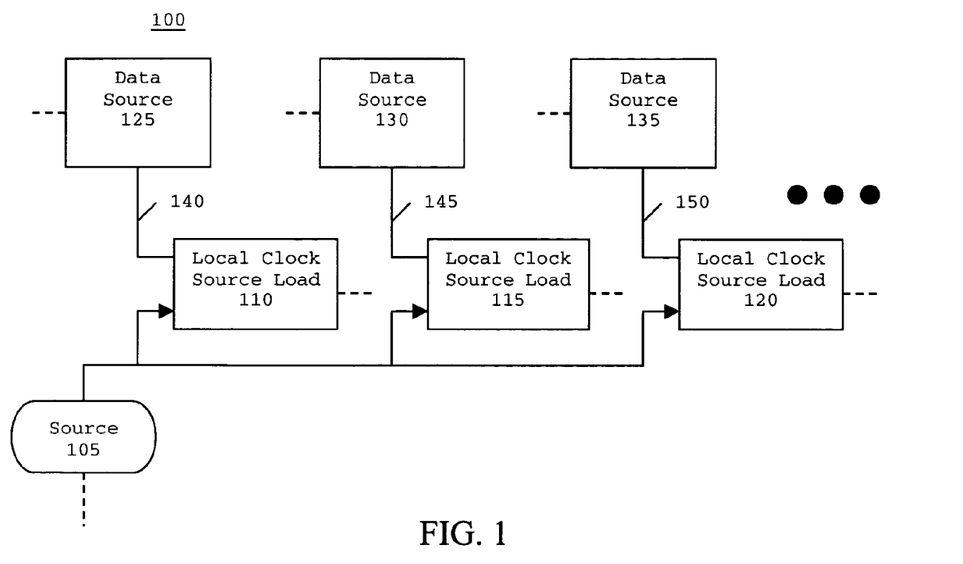
FIG. 1 is a schematic diagram illustrating an exemplary local clock net in accordance with one embodiment of the inventive arrangements disclosed herein.

FIG. 1 is a schematic diagram illustrating an exemplary local clock net 100 in accordance with one embodiment of the inventive arrangements disclosed herein. As shown, the local clock net 100 can include a local clock source or source 105, data sources 125 to 135, and local clock source loads 110, 115, and 120 where the local clock source loads may include latches or flip-flops. Each of the data sources 125–135 can be linked with the corresponding local clock source loads through connections 140, 145, and 150.

It should be appreciated that the local clock net 100 is provided for purposes of illustration only. As such, the local clock net 100 can include additional data sources, connections, and local clock source loads. Further, in accordance with the inventive arrangements disclosed herein, a plurality of local clock nets can be included within a circuit design.

Timing requirements for routing connections of the local clock net 100 can be attained by assigning the source 105 and its components, for example, the data sources, 125–135, and local clock source loads 110–120, of the local clock net 100 to locations in particular areas of the chip. Generally, each component of the local clock net can be assigned a location, or be constrained, to a restricted area with respect to the source. In this manner, delay requirements with respect to clock signals within the local clock net 100 can be attained when signals are routed during the routing process. The restricted area is referred to as a solution window.

Figure 2:
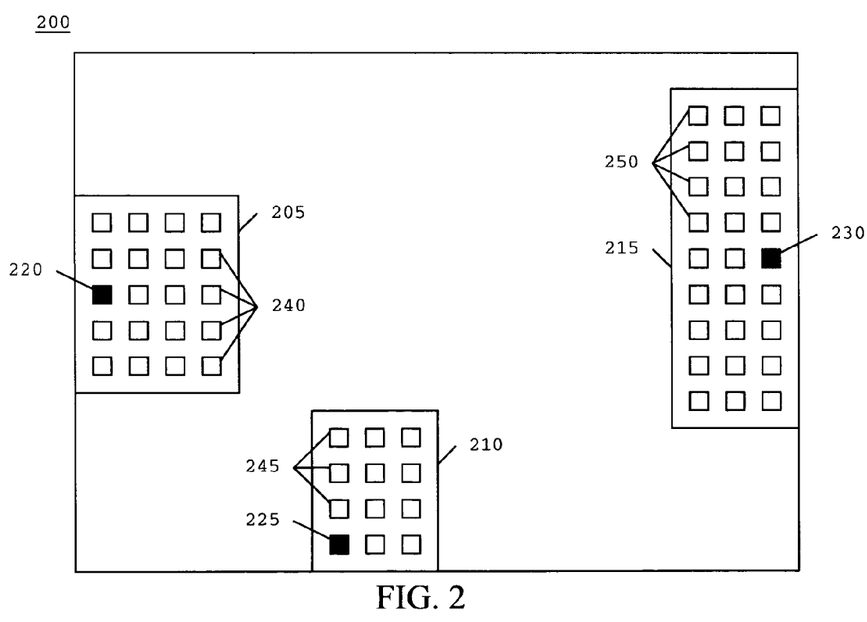
FIG. 2 is a schematic diagram illustrating an exemplary Field Programmable Gate Array (FPGA) circuit design where possible solution windows have been identified.

FIG. 2 is a schematic diagram illustrating an exemplary FPGA circuit design 200 where possible solution windows have been identified. The circuit design 200 includes solution windows 205, 210, and 215. Each solution window can include one or more circuit components corresponding to a given local clock net. Solution window 205 includes a local clock source 220 and one or more components 240, for example local clock source loads and data sources, corresponding to the local clock net for the local clock source 220. The solution window 210 includes a local clock source 225 and one or more components 245. Similarly, solution window 215 includes a local clock source 230 and one or more components 250.

Solution windows are defined in a manner that depends upon the architecture of the particular chip being developed. Each solution window is defined to cover an area that encompasses, or provides components placed within the solution window area access to, fixed circuit design resources including, but not limited to, ground pins, block Random Access Memory (RAM), input/output blocks (IOB's), processors, and the like. Accordingly, solution windows need not be equal in size or shape. Rather, solution windows vary in accordance with the location of the solution window upon the chip and the chip architecture itself.

As shown, each solution window 205, 210, and 215 can include a different number of components as each varies in size according to the location of the solution window on the chip. Further, as many chip resources are fixed for FPGA and Application Specific Integrated Circuits (ASIC's), each solution window provides access to different sets of circuit resources. In illustration, by placing local clock source 220 as shown, the architecture of the chip 200 dictates that solution window 205 is used. Solution window 205 is configured to include a local clock net having a local clock source located at the position indicated. If the local clock source 220 were to be moved one position to the right, an entirely different solution window (not shown) may be identified and used.

As each solution window can differ in size and available resources, local clock nets must be placed in solution windows that are sized to include all components of the local clock net and which include the resources required by the local clock net. Thus, for a local clock net to be constrained to a solution window, the solution window must be large enough to include the components of the local clock net including the local clock source, connections, data sources, and local clock loads of the local clock net. Further, if the local clock net requires access to a resource such as block RAM, for example, the solution window must encompass that resource, or at least a portion of the resource such that signals between the local clock net and the resource can be appropriately routed to meet design constraints with respect to signal delay and skew.

Thus, the solution window for a given local clock net is located according to the unique location on which the local clock source is placed. Based upon the routing fabric and architecture of the FPGA and the delay times for routed connections, the size and shape of a solution window varies with the placement of the local clock source.

Figure 3:
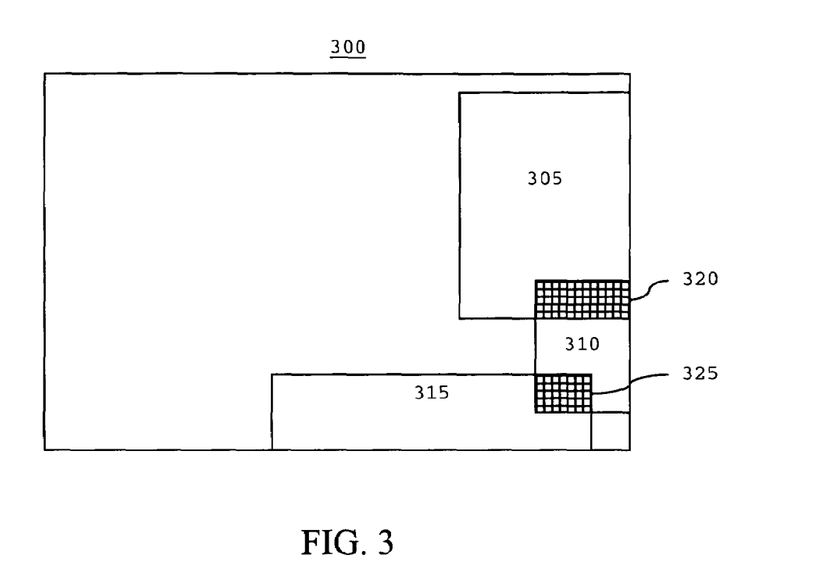
FIG. 3 is a schematic diagram illustrating another exemplary FPGA circuit design where possible solution windows have been identified and overlap with one another.

FIG. 3 is a schematic diagram illustrating another exemplary FPGA circuit design 300 where possible solution windows have been identified. FIG. 3 illustrates the case where components of multiple local clock nets have been placed close to one another. As shown, the solution windows 305 and 310, and 310 and 315 overlap with one another. In accordance with an embodiment of the present invention, solution windows assigned to local clock nets can overlap with the condition that all the components related to each local clock net can be placed within the solution window assigned to that particular local clock net. That is, a component used by two different local clock nets corresponding to solution windows 305 and 310 must be located in the overlapping region 320. Similarly, a component used by local clock nets corresponding to solution windows 310 and 315 must be located in the overlapping region 325.

Figure 4:
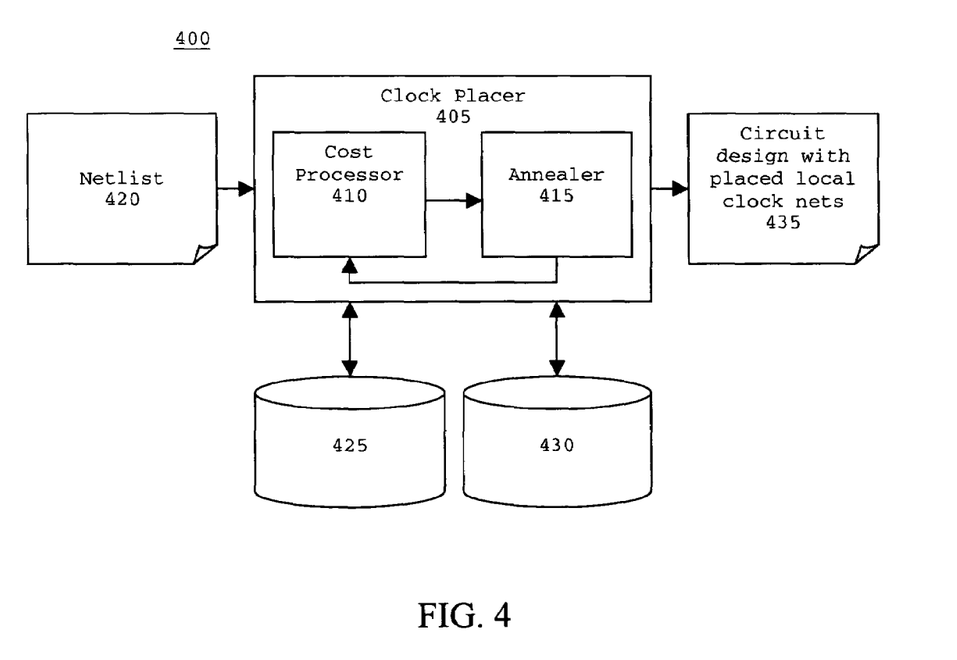
FIG. 4 is a schematic diagram illustrating a system for placing local clock nets in accordance with one embodiment of the inventive arrangements disclosed herein.

FIG. 4 is a schematic diagram illustrating a system 400 for placing local clock nets in accordance with one embodiment of the inventive arrangements disclosed herein. As shown, the system 400 can include a clock placer 405 having a cost processor 410 and an annealer 415.

The clock placer 405 can be a software component or application that determines placements of local clock nets.

The clock placer 405 can determine an initial placement of components for local clock nets and operate upon the initial placement to systematically determine a final placement for the local clock nets in a FPGA circuit design.

The cost processor 410 can be programmed to access the data store 430 to retrieve cost functions and calculate values for the cost functions. The cost functions model predetermined input timing requirements and any other placement and/or design constraints that may be specified in the data store 425. As such, the cost functions are used to determine the quality of placement decisions made during the annealing process to be described herein. The cost processor 410 computes values for any of several different cost functions depending upon the placement task at hand as need by the annealer 415. It should be appreciated, however, that according to another embodiment of the present invention, the cost functions that model the various design constraints disclosed herein can be programmed into the cost processor 410 such that data stores 425 and/or 430 are not required.

As noted, the cost functions processed by the cost processor 410 provide a measure of quality for a placement by modeling design constraints. The cost functions also provide a measure for evaluating how closely a component placement conforms with established design constraints. Thus, the cost functions reflect the impact of placing a component at a particular location.

One cost function, $C_{component}$, provides a quality metric for the placement of local clock net components such as local clock source loads and data sources. The cost function can be assigned a value of 0 when the component is located or assigned to a location within the solution window that includes the local clock source of the same local clock net as the component. If the component is not assigned to a location within the solution window having the local clock source of the same local clock net, $C_{component}$ can be assigned a value that is proportional to the distance from the location of the component to that solution window.

Another cost function, $C_{source}$, is calculated based on a comparison of available resources covered by the solution window and the total resources required to place all of the components of the local clock net corresponding to the local clock source placed in the solution window. When calculating the available resource capacity within the solution window, equal portions of resources are taken into account for a location covered by multiple solution windows currently assigned to more than one local clock net. If any location is covered by "n" solution windows, that location is considered to have capacity equal to 1/n as being available for each overlapping solution window.

Additionally, a number of different resources of FPGA's can be connected to more than one local clock net. These resources can include, but are not limited to, IOB's, logic blocks, block RAM's, and the like. To determine whether or not a solution window covers adequate resources to place a local clock net, all of the resource types that are required by the local clock net are examined. If any type of resource is not adequate for placing the components related to the local clock net, a high value is assigned to the cost function $C_{source}$ indicating that the location is disfavored for placing or assigning the subject component.

The cost function $C_{source}$ also accounts for cases where relatively placed modules (RPM's) are to be relocated. A RPM is a cluster of components that are assigned positions relative to one another. The entire cluster, or RPM, can be placed at a particular location on the physical circuit design as may be required. By using RPM's, entire functional blocks of logic can be manipulated or easily relocated on a chip with less effort than would be required to relocate or assign new locations to each of the components of the RPM on an individual basis. Moreover, for timing critical logic blocks, the constituent components can maintain locations relative to one another thereby ensuring that timing requirements within the RPM are met despite the placement of the RPM on the chip.

In any case, when evaluating the placement of a local clock source, the cost function $C_{source}$ also can evaluate whether each component of the RPM can be placed within a larger component connected to the local clock, and the larger component is within the solution window. If either of the two conditions is not met, a high value can be assigned to the cost function to discourage the assignment of the RPM to that location.

Another cost function, $C_{selectI/O}$, evaluates the I/O assignments of the local clock nets. The I/O assignments are analyzed and relocated as necessary to ensure that the I/O's conform with select I/O standards. Select I/O standards ensure that I/O's located on a same bank of the physical circuit design do not conflict with one another.

The I/O's of a FPGA device can be configured to conform to any one of a variety of different I/O standards. Not all of these standards, however, are compatible with one another. To avoid incompatibility issues, the I/O's of a FPGA circuit design are arranged in groupings called banks. While banks can vary from one circuit design to another, typically, banks span approximately one-half the length of an edge of a chip. Accordingly, a conventional rectangular chip can include 8 banks of I/O's, 2 per side. The I/O's within each bank must conform to I/O standards that are compatible with one another.

The cost function $C_{selectI/O}$ evaluates the placement of I/O's according to Select I/O standards and, as such, models the Select I/O standards. The cost function $C_{selectI/O}$ penalizes any movement of components that leads to an illegal placement of I/O's with respect to Select I/O standards.

The overall placement of the circuit design can be evaluated by summing each individual cost function such that the overall cost "C" of a placement is $C_{component}+C_{source}+C_{selectI/O}$. Those skilled in the art will recognize that the individual cost functions can be weighted to increase the importance or influence of one or more of the individual cost functions in cost function "C" for the placement of the local clock net. In particular, the select I/O cost function can be weighted such that if the movement of a component causes select I/O standards to be violated, despite the fact that the movement may be beneficial with respect to the other cost functions, that movement can be disfavored.

The annealer 415 determines placement solutions for selected circuit components by implementing a simulated annealing process. The simulated annealing process is one variety of stochastic hill-climber algorithm inspired through an analogy with the cooling of metals. The simulated annealing process is disclosed by S. Kirkpatrick, C. D. Gelatt, and M. P. Vecchi: "Optimization by simulated annealing", *Science*, vol. 220, no. 4598, pp. 671–680 (May 13, 1983), which is incorporated herein by reference.

The annealing process implemented by the annealer 415 begins with a simulated high temperature and begins randomly generating placement solutions by relocating one or more components or swapping the position of two or more components of the local clock net, whether the components are local clock sources, local clock source loads, or data sources. After each component swap or iteration, the annealer 415 accesses the cost processor 410 to recalculate the relevant cost function to evaluate the proposed solution.

If the cost function decreases, indicating that the proposed solution has improved over the last iteration, the solution can be accepted as the current solution and used as a basis for subsequent annealing iterations. If, however, the cost function increases, the solution may or may not be accepted. Specifically, placement solutions producing increasing cost functions can be accepted as the current solution, but also can be assigned a probability that is dependent upon the current value of the temperature.

The probability of accepting a proposed solution showing an increase in a cost function decreases as the temperature decreases during the annealing process. The annealing process incorporates a cooling schedule, or rate of decrease of temperature, such that at high temperatures, almost any proposed placement solution is accepted. Accordingly, at high temperatures, the annealer 415 stresses the exploration of different placement solutions. At lower temperatures, the probability of accepting a solution in which the cost function increases is lessened. Thus, at lower temperatures, the annealer 415 stresses exploitation of placement solutions under development and converges to a solution.

In operation, a netlist 420 can be provided to the clock placer 405. The clock placer 405 can determine an initial placement for components of the local clock nets. Using the annealer 415 and the cost processor 410, the clock placer 405 can anneal the components of the local clock nets of the circuit design to determine a circuit design with placed local clock nets 435. As noted, design constraints stored in data store 425 and cost functions stored in data store 430 are modeled by the cost functions calculated by the cost processor 410.

Those skilled in the art will recognize that the present invention is not limited by the particular software configuration or architecture disclosed. For example, while the system 400 is depicted as a clock placer 405 having a cost processor 410, an annealer 415, and access to one or more data stores, according to another embodiment, the components can be combined into a single, more complex program. In another embodiment, each of the various tasks described herein can be implemented using a single software component or various combinations of the components disclosed herein.

Figure 5A:
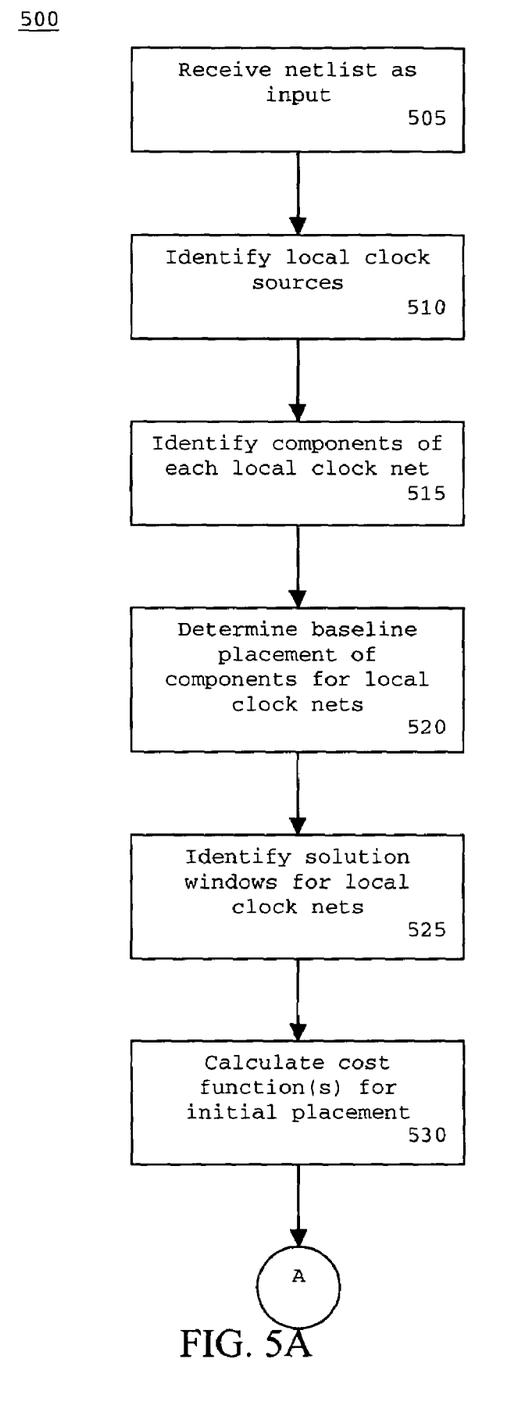
FIGS. 5A and 5B, taken together, form a flow chart illustrating a method of determining a placement for local clock nets for an FPGA circuit design.
Figure 5B:
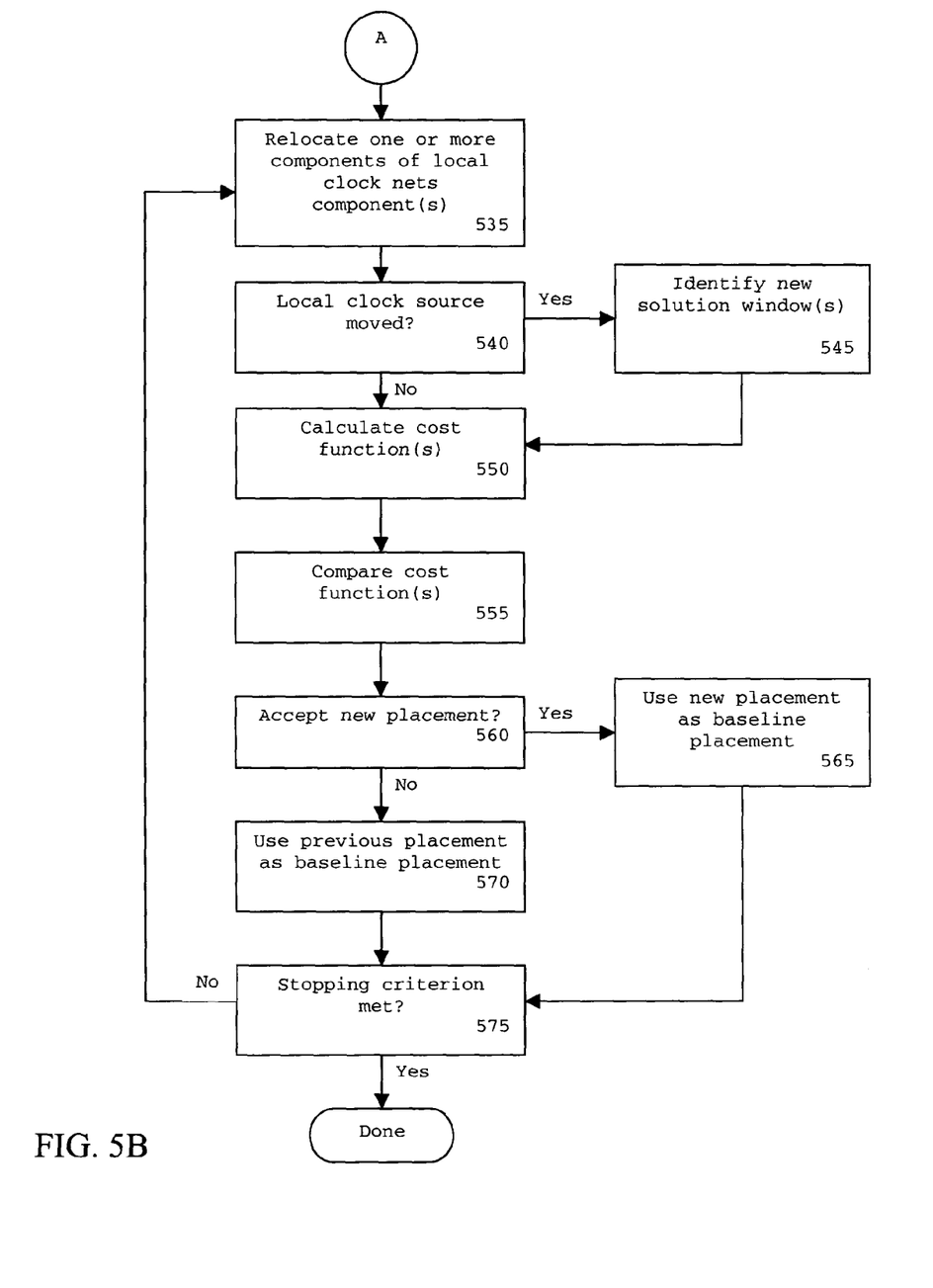

FIGS. 5A and 5B, taken together, are a flow chart illustrating a method 500 of determining a placement for local clock nets for an FPGA circuit design. The method 500 can begin in a state where a netlist for an FPGA circuit design has been generated. Also, as described, solution windows have been established according to the architecture of the FPGA circuit design to be placed. In step 505 of FIG. 5A the netlist can be provided as an input to a computer-based tool such as a clock placer configured to determine placements for local clock nets as described herein.

In step 510, from the netlist, the local clock sources can be identified. Accordingly, in step 515, the components corresponding to each local clock source, and therefore local clock net, can be identified. Thus, after step 515, the placer has identified each local clock net and the source and the various components corresponding to each local clock net.

In step 520, an initial placement for the components of the local clock nets can be determined. The initial locations assigned to the components form a baseline placement upon which an annealing process can operate. Because the annealing process determines a placement solution under the guidance of one or more cost functions through an iterative methodology, the baseline placement can be a random placement. The placer can assign random locations to each component of the local clock nets. In another embodiment, however, the initial placement can be a more sophisticated placement that conforms with one or more predetermined design constraints.

In step 525, solution windows for the local clock nets are identified. That is, based upon the initial placement of local clock sources, solution windows defining a region surrounding each local clock source can be determined. As noted, the particular size, shape, and location of each solution window varies with the particular location to which the corresponding local clock source is assigned as well as the architecture of the FPGA being placed.

In step 530, one or more cost functions can be calculated for the initial placement. More particularly, values for the individual cost functions $C_{component}$, $C_{source}$, and $C_{selectI/O}$ can be determined. Accordingly, a value for the overall cost function denoted as "C" which incorporates each individual cost function can be determined as well.

Proceeding to FIG. 5B, in step 535, the annealing process can begin. Accordingly, one or more components of local clock nets can be moved or swapped. In step 540, a determination can be made as to whether a local clock source was one of the components or the component moved during step 535. If so, the method can proceed to step 545. If not, the method can continue to step 550.

In step 545, a new solution window can be identified. As noted, the shape, size, and location of the solution window is dictated by the particular location to which the local clock source was moved or assigned. If more than one local clock source was moved to a new location, then a new solution window can be identified for each relocated clock source. Once a new solution window is identified, the method can proceed to step 550.

In step 550, the cost function "C" can be recalculated. In step 555, the prior value of the cost function can be compared with the most recent cost function calculation. The difference in cost functions between placing a component on the source (original) location and placing the component on the target (new) location indicates whether the movement of the components is favored. The cost functions guide the annealing process to determine the correct set of solution windows for all of the local clock nets.

In step 560, a determination can be made as to whether the new placement should be accepted or rejected. As noted, if the cost function improves or decreases, the new placement can be accepted. If not, the new placement can be rejected. Still, as noted, depending upon the annealing process temperature when the cost function comparison is made, placement solutions having cost functions that do not improve can be accepted with a conditional probability. According to one embodiment of the present invention, the conditional probability can be determined using the Boltzmann probability function ($e^{(\Delta c/(k_B T))}$). In the Boltzmann probability function, $\Delta C$ is the cost function change, which equals the new value of the cost function after a component change or swap subtracted from the current value of the cost function. T is the temperature, and $K_B$ is the Boltzmann constant.

It should be appreciated that any of a variety of different cost functions can be employed such that improvements in local clock net placements can be reflected by increases in cost function values. Additionally, those skilled in the art will appreciate that other rules can be implemented that require the cost function to increase by a predetermined amount or percentage before a new placement is accepted.

If the new placement is accepted, the method can proceed to step 565. In step 565, the new placement is identified as the new baseline placement to be used in the next iteration of the annealing process. If the new placement is rejected, however, the method can proceed to step 570, where the prior placement, that is the placement that existed before the latest iteration of step 535, can be used as the baseline placement for the next iteration of the annealing process.

In step 575, a determination can be made as to whether one or more stopping criterion have been met. In one embodiment, if the cost function becomes less than a predetermined value, the method can end. This criterion indicates that a satisfactory placement of local clock nets has been achieved. The placement of local clock nets from the netlist conforms to design constraints modeled in the cost functions. Another stopping criterion can include determining whether the annealing process has completed at least a predetermined number of iterations. If the annealing process has met this threshold, the method can end.

Yet another stopping criterion can include determining whether the cost function improves by at least a predetermined percentage or amount during each iteration, or after a particular number of iterations. If so, the annealing process is converging upon a placement solution. If not, the lack of improvement in the cost function may indicate that the annealing process is not succeeding. In any case, if a stopping criterion is met, the method can end. If a stopping criterion is not met, the method can loop back to step 535 and repeat as necessary.

Embodiments of the present invention provide a solution for assigning locations, or determining placements, for local clock nets in FPGA circuit designs. In accordance with the inventive arrangements disclosed herein, a feasible placement solution can be achieved for local clock nets that conforms with various design constraints. The local clock nets can be placed and evaluated without having to first perform signal routing to determine whether timing requirements have been met.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

The invention claimed is:

1. A method of placing local clock nets in a circuit design comprising the steps of:

identifying the local clock nets for the circuit design;

selecting components corresponding to each local clock net; determining a set of solution windows having defined circuit resources;

assigning initial locations to each component of the local clock nets;

generating a plurality of cost functions to evaluate different placements of components of the local clock nets; and using the plurality of cost functions, assigning locations to each component of the local clock nets, wherein said assigning locations comprises annealing by constraining local clock nets to particular solution windows.

2. The method of claim 1, said generating step further comprising the step of calculating the cost function indicating whether components of one of the local clock nets are located within the solution window identified by the local clock source of the local clock net.

3. The method of claim 1, said generating step further comprising the step of calculating the cost function indicating whether the solution window associated with one of the local clock nets includes sufficient resources for use by the local clock net.

4. The method of claim 1, said generating step further comprising the step of calculating the cost function indicating whether each component of a relatively placed module can be located within the solution window.

5. The method of claim 1, said generating step further comprising the step of calculating the cost function indicating whether inputs and outputs related to the local clock nets conform to select input and output standards.

6. A system for placing local clock nets in a circuit design comprising:

means for identifying the local clock nets for the circuit design;

means for selecting components corresponding to each local clock net means for determining a set of solution windows having defined circuit resources;

means for assigning initial locations to each component of the local clock nets;

means for generating a plurality of cost functions to evaluate different placements of components of the local clock nets; and means for annealing the components of the local clock nets using the plurality of cost functions to assign locations to each component of the local clock nets wherein said means for annealing further comprises means for constraining local clock nets to particular solution windows using the means for generating the plurality of cost functions.

7. The system of claim 6, wherein said means for annealing continues operation until at least one stopping criterion is met.

8. The system of claim 6, said means for generating further comprising means for calculating the cost function indicating whether components of one of the local clock nets are located within the solution window identified by the local clock source of the local clock net.

9. The system of claim 6, said means for generating further comprising means for calculating the cost function indicating whether the solution window associated with one of the local clock nets includes sufficient resources for use by the local clock net.

10. The system of claim 6, said means for generating further comprising means for calculating the cost function indicating whether each component of a relatively placed module can be located within a larger component connected to the local clock source and wherein the larger component is within the solution window.

11. The system of claim 6, said means for generating further comprising means for calculating the cost function indicating whether inputs and outputs related to the local clock nets conform to select input and output standards.

12. A machine readable storage, having stored thereon a computer program having a plurality of code sections executable by a machine for causing the machine to perform the steps of:

identifying the local clock nets for the circuit design;

selecting components corresponding to each local clock net determining a set of solution windows having defined circuit resources;

assigning initial locations to each component of the local clock nets;

generating a plurality of cost functions to evaluate different placements of components of the local clock nets; and annealing the components of the local clock nets using the at least one cost function to assign locations to each component of the local clock nets said annealing step further comprising the step of constraining local clock nets to particular solution windows using the plurality of cost functions.

13. The machine readable storage of claim 12, wherein said annealing step continues until at least one stopping criterion is met.

14. The machine readable storage of claim 12, said generating step further comprising the step of calculating the cost function indicating whether components of one of the local clock nets are located within the solution window identified by the local clock source of the local clock net.

15. The machine readable storage of claim 12, said generating step further comprising the step of calculating the cost function indicating whether a solution window associated with one of the local clock nets includes sufficient resources for use by the local clock net.

16. The machine readable storage of claim 12, said generating step further comprising the step of calculating the cost function indicating whether each component of a relatively placed module (RTM) can be located within a cell connected to the local clock source of the solution window.

17. The machine readable storage of claim 12, said generating step further comprising the step of calculating the cost function indicating whether inputs and outputs related to the local clock nets conform to select inputs and output standards.

* * * * *